(12) United States Patent
Kravets et al.

(10) Patent No.: US 6,363,377 B1
(45) Date of Patent: Mar. 26, 2002

(54) SEARCH DATA PROCESSOR

(75) Inventors: Dina Kravets, West Windsor; Liviu Chiriac, Plainsboro; Jeffrey Esakov, Hamilton Square; Suz Hsi Wan, Princeton, all of NJ (US)

(73) Assignee: Sarnoff Corporation, Princeton, NJ (US)

( * ) Notice: Subject to any disclaimer, the term of this patent is extended or adjusted under 35 U.S.C. 154(b) by 0 days.

(21) Appl. No.: 09/218,570

(22) Filed: Dec. 22, 1998

Related U.S. Application Data

(60) Provisional application No. 60/094,694, filed on Jul. 30, 1998.

(51) Int. Cl.[7] ............................................. G06F 17/30
(52) U.S. Cl. ............................... 707/4; 707/5; 345/327
(58) Field of Search ......................... 707/4, 5; 345/327

(56) References Cited

U.S. PATENT DOCUMENTS

| | | | | |
|---|---|---|---|---|
| 5,175,814 A | * | 12/1992 | Anick et al. | 345/348 |
| 5,278,980 A | * | 1/1994 | Pedersen et al. | 707/4 |
| 5,471,613 A | * | 11/1995 | Banning et al. | 707/4 |
| 5,488,725 A | * | 1/1996 | Turtle | 707/5 |
| 5,500,920 A | * | 3/1996 | Kupiec | 704/270.1 |
| 5,608,624 A | * | 3/1997 | Luciw | 707/532 |
| 5,625,814 A | * | 4/1997 | Luciw | 707/5 |
| 5,781,898 A | * | 7/1998 | Fukatsu et al. | 707/4 |
| 5,826,260 A | * | 10/1998 | Byrd, Jr. et al. | 707/5 |
| 5,835,087 A | * | 11/1998 | Herz et al. | 345/327 |
| 5,842,203 A | * | 11/1998 | D'Elena et al. | 707/4 |
| 5,924,090 A | | 7/1999 | Krellenstein | |
| 5,987,457 A | * | 11/1999 | Ballard | 707/5 |
| 5,999,929 A | * | 12/1999 | Goodman | 707/7 |
| 6,029,195 A | * | 2/2000 | Herz | 725/116 |
| 6,038,574 A | * | 3/2000 | Pitkow et al. | 707/513 |

OTHER PUBLICATIONS

Hanani, Michael Z., An Optimal Evaluation of Boolean Expressions in an online Query System, Communications of the ACM, May 1977, vol. 20, No. 5, pp 344–347.*

Duppel, N. Parrallel SQL on Tandem's NonStop SQL, Compcon Spring '89, Thirty–fourth IEEE Computer International Conference: INtellectual Leverage, Feb. 27–Mar. 3, 1989, pp. 168–173.*

Iwaihara, M. et al., Bottom–Up Evaluation of Logic Programs Using Binary Decision Diagrams, Data Engineering, 1995, Proceedings of the Eleventh International Conference on, Mar. 6–10, 1995, pp. 467–474.*

Antoshenkov, G., Dynamic Optimization of Index Scans restricted by Booleans, Data Engineering, 1996, Proceedings of the Twelveth International Conference on, Feb. 26–Mar. 1, 1996, pp. 430–440.*

* cited by examiner

Primary Examiner—Paul R. Lintz
(74) Attorney, Agent, or Firm—William J. Burke

(57) ABSTRACT

A tool to be used with a search engine for a information management system includes methods for refining, filtering, and organizing search queries and search results. A query tuner in the tool allows a user to automatically reformulate a query in order to find a reasonable number of matching documents from the search engine by selectively modifying individual search terms to be weaker or stronger and concurrently requesting a plurality of searches, each with a respectively different modified query. The tool also uses a dynamic filter which employs a dynamic set of record tokens to restrict the results of an arbitrary search query to selectively include or exclude records which correspond to the set of record tokens. The tool also includes a results organizer which aids the user in understanding and visualizing a large number of matching documents returned in response to a search query by clustering like items returned from the search. The query tuner, dynamic filter and results organizer may be used individually or in conjunction. The searched information management system may be consolidated or distributed and may span a global information network such as the Internet.

14 Claims, 11 Drawing Sheets

SARNOFF RESULT ORGANIZER http://unil.sarnoff.com:1800/Ascit/ascit.pl

QUERY [NEWARK AIRPORT]

MAX # HITS [400]    ☐ OFFLINE DEMO    RESULT FILE: [NEWARK AIRPORT]    [SUBMIT QUERY] [RESET]

| CLUSTER NUMBER | CLUSTER SIZE | COMMON PHRASE | REPRESENTATIVE DOCUMENT | VOTE |
|---|---|---|---|---|
| 1 | 23 | /www.quickaid.com/airports | 54. QuickAID:EWR:Classic Airport Share Ride:EWR to Central Islip<br>71% –From Newark Airport, take the Princeton Airporter shuttle to Kennedy Airport, and pick up a Classic Airport van there. Arrangements can be made at the Ground Transportation information Counters, located on the baggage claim level of Terminals A, B and C. Return to: QuickAID Main Menu II QuickAID's List of Airporters II Newark International Airport, Copyright © 1995–1997 by QuickATM<br>http://www.quickaid.com/airport/ewr/stop/ewr0444/dd.html | 👍 👎 |
| 2 | 56 | DIRECTIONS | 28. Directions to Atalanta Corporation<br>72% –Towards the end of the road it will split into a "Y", bear to the left. Further down on the left side is a sign that reads, "Main Entrance".<br>http://www.atalanta.com/directions.html | 👍 👎 |
| 3 | 33 | INTERNATIONAL | 7. Getting to Newark International Airport (EWR) by Express Motorcoach<br>75% –212-964-6233 Express Motorcoach service to and from Manhattan is provided by Olympia Trails Buses, which operate between Newark Airport terminals and Grand Central Terminal, at 42nd Street and Park Avenue; Penn Station at 7th Avenue and 33rd Street; and 1 World Trade Center, buses run from 6am–8pm, departing every half.<br>http://www.vnv.com/City/Airports/ewrcoach.html | 👍 👎 |
| 4 | 55 | JERSEY | 1. Newark, New Jersey Hotel Home Page<br>78% –Holiday Inn North Newark Intl 160 Holiday Plz 201-589-1000. Hunt Room The–Holiday Inn North 160 Holiday Plz 201-589-1000.<br>http://www.roomsplus.com/hotels/nj/n/njn10130.html | 👍 👎 |

410 → row 1
420 → row 2
430 → row 3
440 → row 4

FIG. 4  A SAMPLE IMPLEMENTATION OF THE RESULTS ORGANIZER.

FIG. 5

TITLE LENS (500)
- "NjWeb: Dining in New Jersey" 40 (502)
- "YAHOO.." 20 (504)
- No Pattern 40 (506)

URL LENS (510)
- "www.njweb.com/dining/" 40 (512)
- yahoo.com 20 (514)
- metrocast.com 20 (516)
- No Pattern 20 (518)

CONTENT LENS (520)
- "HOME Allendale Bayonne Belleville Bergenfield Bloomfield Butler ..." 40 (522)
- Top Business and Economy Companies Restaurants Organizations 20 (524)
- Cape May County 30 (526)
- No Pattern 10 (528)

AGE LENS (530)
- 04Mar97 40 (532)
- 1997 30 (534)
- 1996 20 (536)
- 1995 10 (538)

(550, 552, 554, 556, 558)

Netscape: Sarnoff Query Tuner http://unll.8003/user.cqi?qry=x28NIST+or+NSFx29+and+proposal&lower=10

Sarnoff Query Tuner

QUERY: [(NIST or NSF) and proposal]
Example: chinese(1) food AND (nj OR new (1) jersey) AND NOT hunan

DESIRED # MATCHES: [10]   ☐ ONLINE DEMO   [SUBMIT QUERY] [RESET]

query:((NIST and proposal) or (NSF and proposal)) matches 919 pages

First 5 matching pages:
http://www.eng.nsf.gov/eec/9-rochst.htm
http://www.atp.nist.gov/atp/conf/atp98bid.htm
http://www.qeo.nsf.gov/adqeo/budget/98budget/98qeo.htm
http://www.nsf.gov/pubs/stis1996/nsf9731/nsf9731.txt
http://www.atp.nist.gov/atp/conf/02-13mtg.htm Now seeking similar queries that result in closer to 10 hits.
query:(body: NSF and proposal (50) NIST) matches 15 pages
query:(body: NSF and proposal (100) NIST) matches 16 pages
query:(headings: NSF and proposal (100) NIST) matches 2 pages
query:(body: NIST and proposal (50) NSF) matches 27 pages
query:(body: proposal and NSF (100) NIST) matches 32 pages

FIG. 11

SEARCH DATA PROCESSOR

This application claims benefit of the filing date of provisional application No. 60/094,694 filed Jul. 30, 1998.

This invention was made under U.S. Government Contract NROXXX-96-G-3006. The Government has certain rights in the invention.

TECHNICAL FIELD

This invention relates generally to the field of search techniques used on information management system or on the global information network ("the World Wide Web"). More specifically, the present invention is a method and system for refining and improving search queries and for organizing the results of a search query by different and overlapping criteria.

BACKGROUND OF THE INVENTION

The blossoming of the World Wide Web in the 1990s has given computer users access to vast quantities of information, an estimated 100–300 million Web pages, many terabytes of data. The user provides the Uniform Resource Locator ("URL") of a page to the browser, the browser retrieves the page from the Internet and displays it to the user. When the user knows the URL of the page, the procedure is simple. However, to find information on the Web, the user must access a search engine. The user submits a query and the search engine returns a list of URL's of pages that satisfy the query together with a summary of each page. The continuing exponential growth of the Web makes the task of finding the relevant information exceedingly difficult. This effort is further aggravated by the unorganized and extremely dynamic nature of the Web.

There are two paths to searching for information on the Web. One path is consulting a manually compiled Web catalog, such as Yahoo. Any manual catalog of the Web necessarily suffers two drawbacks: the nature of the information on the Web makes any cataloging efforts necessarily limited and incomplete, and the catalog offers no help to a user interested in a subject that happens not to be covered by the catalogers.

The other path to searching for information on the Web is using a Web engine. The major ones as of January 1998 are AltaVista, Excite, HotBot, InfoSeek, Lycos, NorthernLight, and Web Crawler, plus a number of branded versions of these. These engines send out programs called robots, or crawlers, which automatically peruse the Web and gather Web pages they discover. The collected pages are automatically indexed and collected into a data base. In this process, known as indexing, Internet URLs are associated with relevant words from the page they identify. Many search engines store page summaries along with URLs. Page summarization varies from one search engine to another. Some search engines store the first fifty words of a document. Other engines, try to understand the content of the pages. They attempt to define relevant "ideas" based on associations of words within documents and they summarize the Web Pages by storing these "ideas". The users can query the indices for pages meeting certain criteria. For example, a user can request all the Web pages found by the search engine that have the phrase "cryptography software" somewhere in the text. There are two major problems with using the search engines: 1) incomplete coverage and 2) difficulty of effective use. Not a single engine contains a complete index of the Web; they index anywhere from 2 million pages by WebCrawler to 100 million pages by AltaVista. Given the explosive growth of the Web and the limitation of time and space faced by search engines, it is unlikely that full coverage of the Web is forthcoming.

Most users feel the incompleteness of the indices only indirectly, since they can not miss a web page if they do not know it exists. The more pressing problem is that using the search engines can be a frustrating, time-consuming, and often unsuccessful process for the user. In most search sessions, the user's needs are well enough formulated in her head that only a small number of web pages would exactly meet her need. The problem then, is getting the search engine to understand the user's needs. Unfortunately, the state of the art in human-machine interaction is far from meeting such a goal. Many user queries produce unsatisfactory results, yielding thousands of matching documents. The search engine indices support many basic information retrieval queries, but the users are offered little guidance in determining which keywords and in which combination would yield the desired content. Typically, the user ends up alternating between specifying too few keywords which yield too many matching documents, and supplying too many keywords which yield no matches. Many search engines lack efficiency in eliminating duplicate URLs from their indices. As a consequence, redundant information is sometimes returned to users, and can create a lot of frustration.

While a number of tools have been developed to help the user search more intelligently, by allowing selection of additional search criteria, none of them offers useful analysis of the query results that could give guidance to the user in reformulating a more appropriate query. Some search engines group and display results based on the popularity of the site. While others attempt to do some type of organization. One such search engine, Northern Light, organizes all the query results into at most 10 folders based on subject, type, source and language. While this is a step in the right direction, the user is not given any information on how the categories are derived or on how many results are in each folder.

SUMMARY OF THE INVENTION

The present invention is embodied in a simple and effective method for improving the searching of an information management system using a search engine and for refining and organizing the search results.

The present invention provides for a query tuner, allowing a user to effectively reformulate a query in order to find a reasonable number of matching documents from the search engine by automatically and selectively modifying individual query terms in the user's query to be weaker or stronger.

One aspect of the present invention provides for a dynamic filter, using a dynamic set of record tokens to restrict the results of a search query to include only records which correspond to the record tokens.

Another aspect of the present invention provides for a results organizer, to aid the user in organizing and understanding a large number of matching documents returned in response to a search query by clustering like items returned from the search.

Another aspect of the present invention provides for a search history, to allow the user to save, organize and search the queries and the documents that best satisfy the query.

It is to be understood that both the foregoing general description and the following detailed description are exemplary, but are not restrictive, of the invention.

DESCRIPTION OF THE DRAWING

The invention is best understood from the following detailed description when read in connection with the accompanying drawings. Included in the drawing are the following Figures:

FIG. 4 is an example of a graphical display of a search query according to a first exemplary embodiment of the present invention;

FIG. 5 is an example of a graphical display of a search query according to a second exemplary embodiment of the present invention.

FIG. 11 is an example of an implementation of the query tuner;

DETAILED DESCRIPTION OF THE INVENTION

Figure 1A:
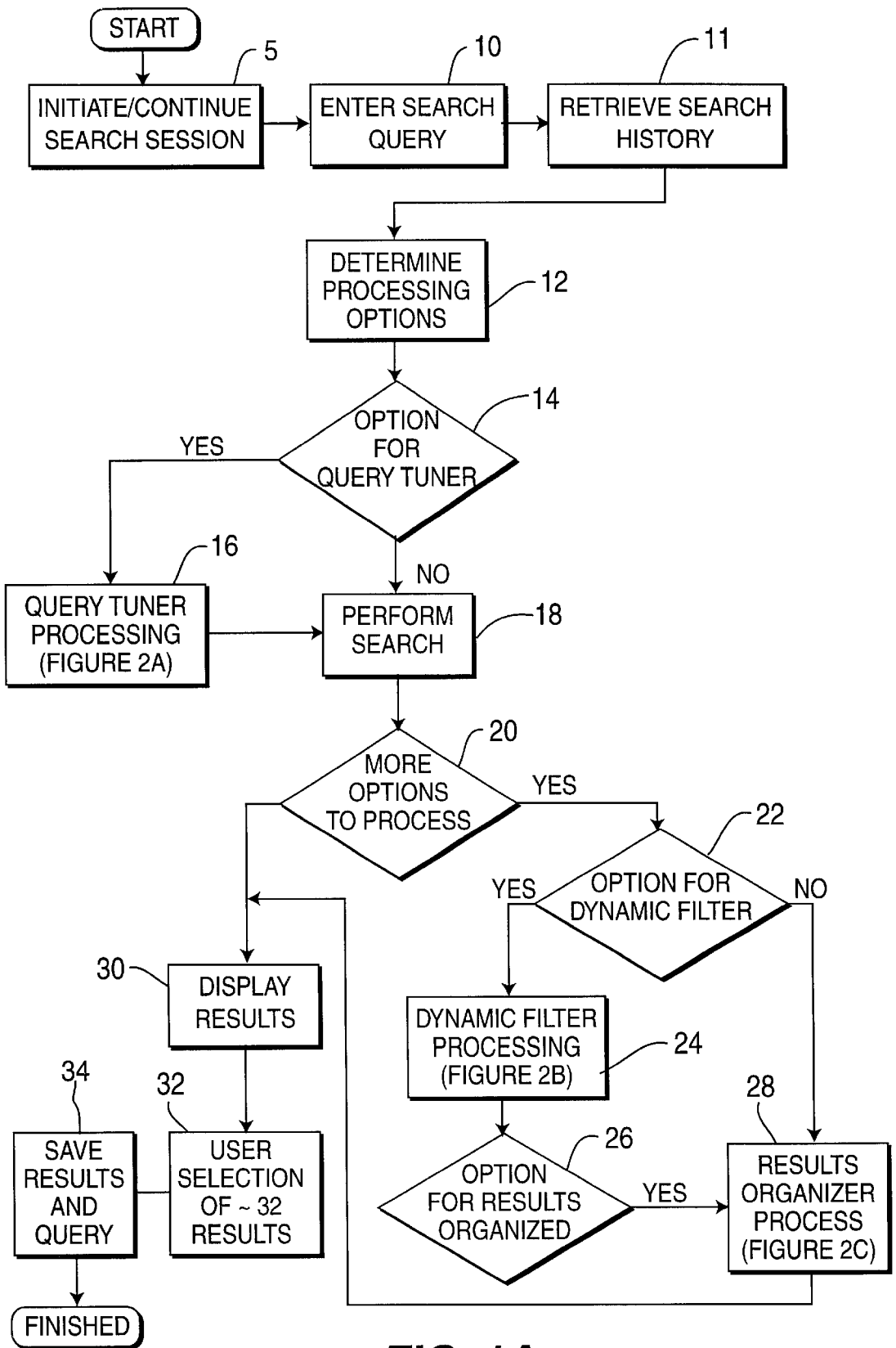
FIG. 1A is a flowchart illustrating a high level chart of the invention.

FIG. 1A shows an overview of the search data processing system. The search data processing system is a computer program which may reside on a carrier such as a disk, diskette or modulated carrier wave. The system, in step 5, begins processing when a user initiates or continues a search session. In step 10 the user enters a search query. If the user is continuing a prior search session, then the history is retreived as shown in step 11 and the previous search's keywords are added to the search query. Next, in step 12, the system determines which of the following processing options are to be performed:

1—Query Tuner Option—Reformulation of a query

2—Dynamic Filter Option—Restriction of the results from a query

3—Results Organizer Option—Organization of the results from a query

The system then begins to process each option individually. First, the system checks, in step 14, if the query tuner option has been selected. If the option has been selected then, in step 16, the query refinement process is initiated and the query is modified prior to the search being performed. The search is then performed as shown in step 18.

The system, in step 20, checks for the existence of additional processing options to be performed. If the system determines, in step 22, that the dynamic filter option has been selected, then the dynamic filter process is performed in step 24. The system, in step 26, determines if the result organizer option has been selected. If this option has been selected, then in step 28, the results organization process is performed. Next, after all options have been processed, the system displays the results in step 30. The system concludes with the user selection of the results as shown in step 32 and, optionally, the user saves the results of the query at step 34.

Figure 1B:
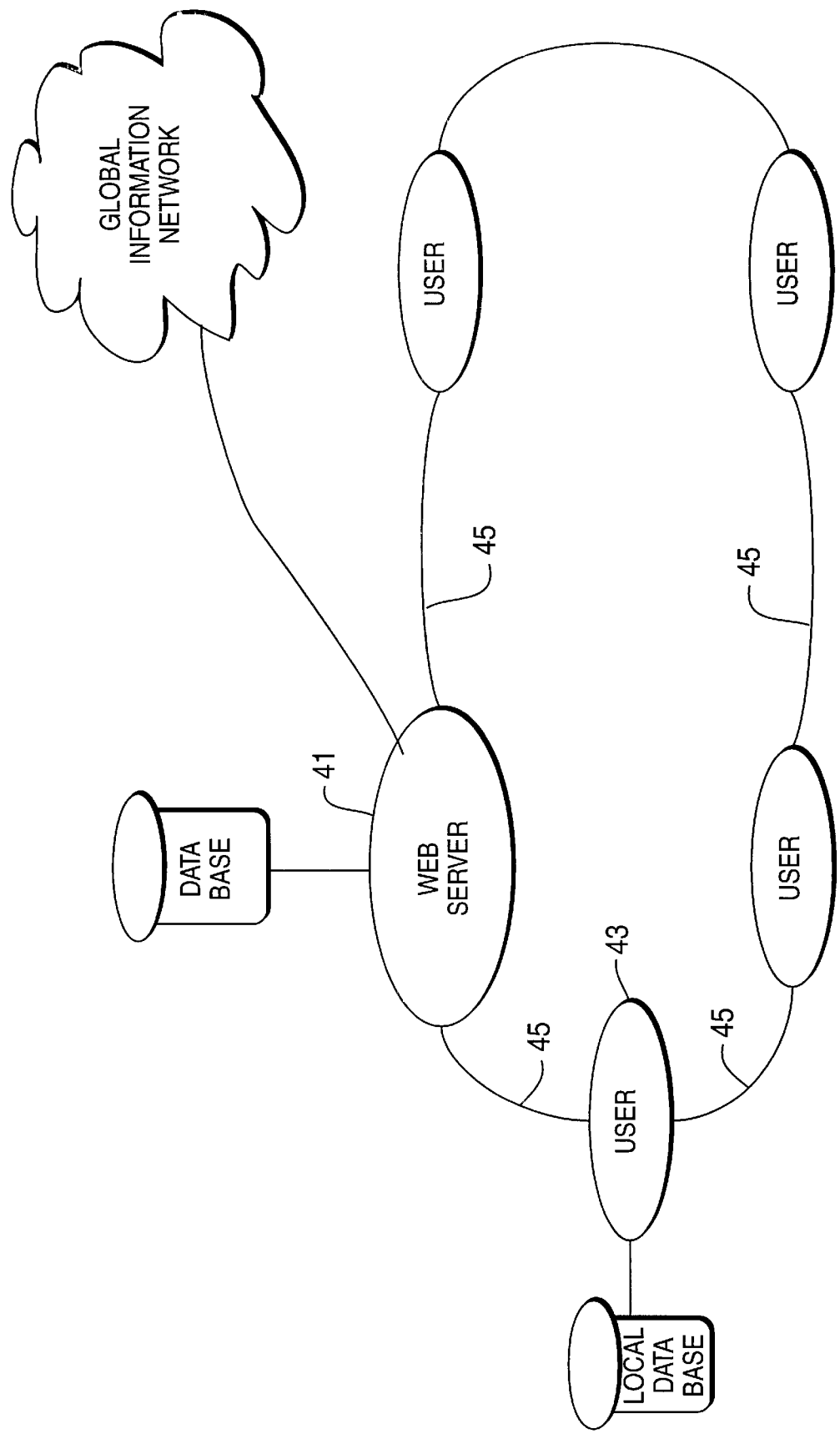
FIG. 1B is an example of a data processing system in which the invention may be implemented.
Figure 3:
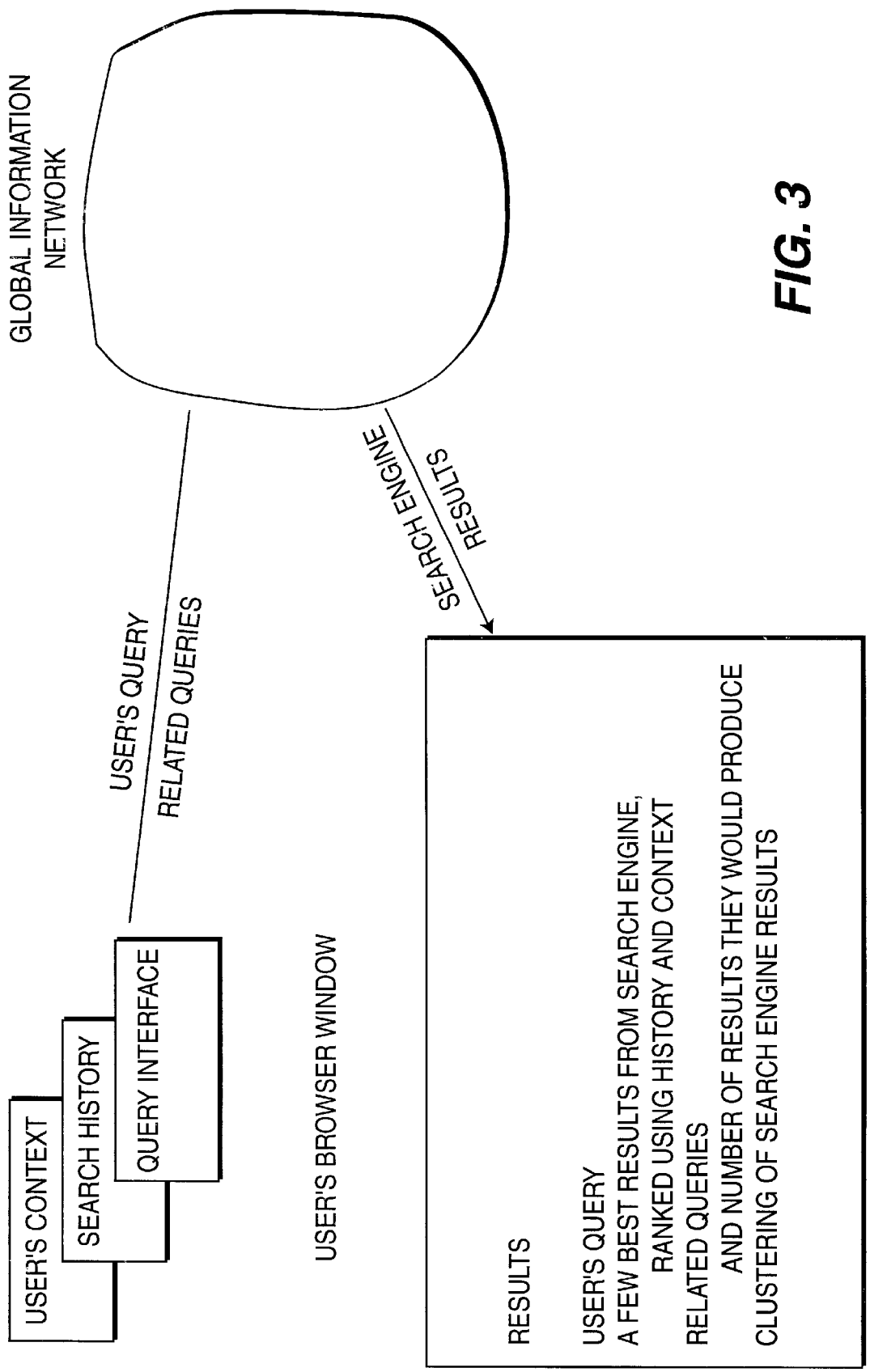
FIG. 3 is a further illustration of the user's operating environment illustrated in FIG. 1B.

An example of a data processing system which can use the search data processing system to search the Web is shown in FIG. 1B. In FIG. 1B, the Web server 41, executes the invention and provides the users 43 access to the Web. The users 43 send their queries over the Lan 45 to the Web server 41. FIG. 3 further illustrates a typical user's interaction with the Web when performing a search. The Web Server relays a users query to a search engine to perform the search.

Figure 1C:
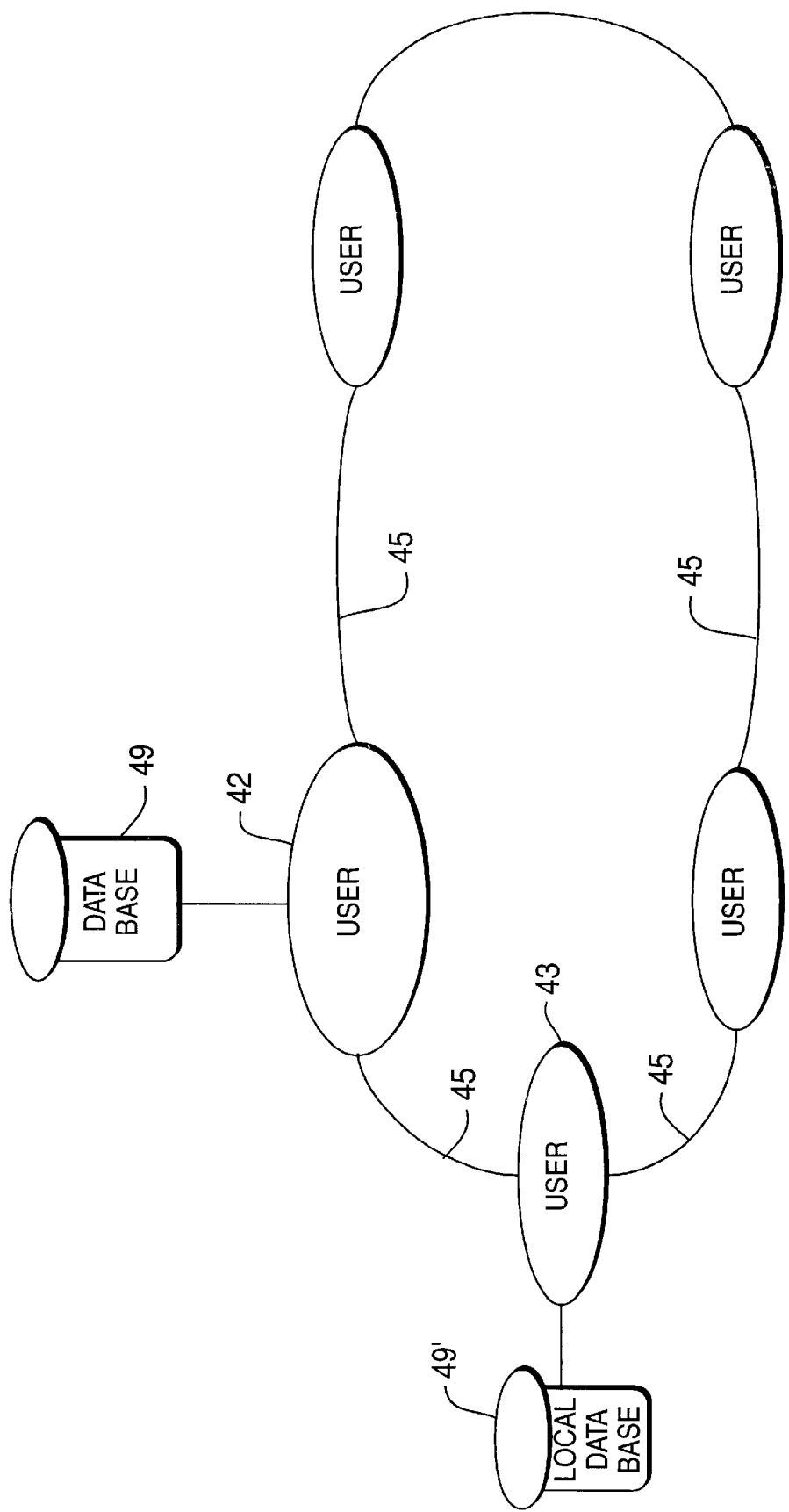
FIG. 1C is an example of another data processing system in which the invention may be implemented.

Although the invention is illustrated in terms of an Internet browser searching pages on the World Wide Web, it is contemplated that it may be generally applied to any information management system. This implementation of the invention is shown in FIG. 1C, where the user 42 executes the invention and information management system 49 is the information management system to be searched. Alternatively, the information management system may be a distributed information management system including both of the information management systems 49 and 49'. In applying the searching techniques described below, it may be desirable to substitute information management system records for the documents and web pages described below and to substitute record tokens or some other identifying field from an information management system record for the URL of the web page.

Figure 2A:
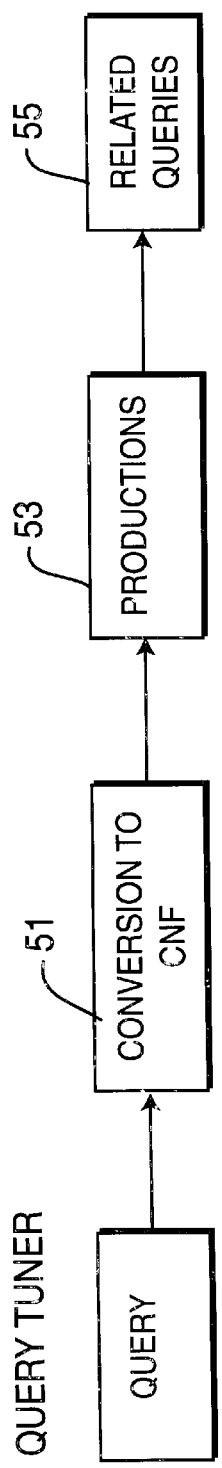
FIG. 2A is a portion of a flow chart illustrating an exemplary implementation of the query tuner operation shown in FIG. 1A.
Figure 2B:
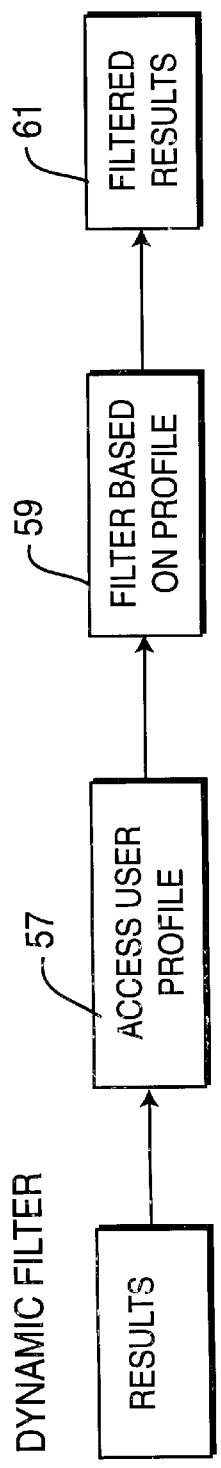
FIG. 2B is a portion of a flow chart illustrating an exemplary implementation of the dynamic filter operation shown in FIG. 1A.
Figure 2C:
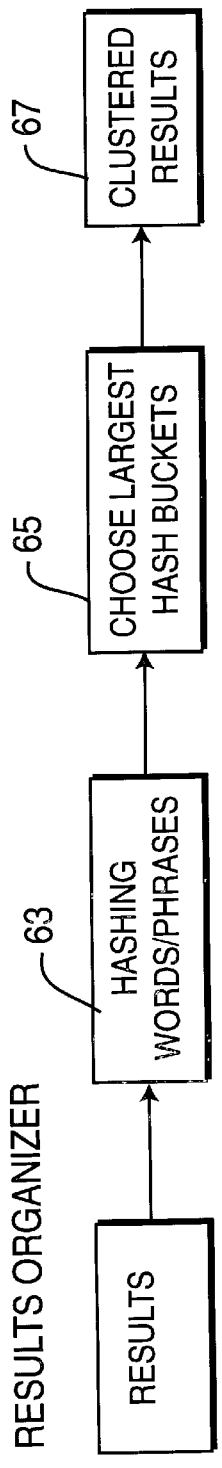
FIG. 2C is a portion of a flow chart illustrating an exemplary implementation of the result organizer operation shown in FIG. 1A.

FIG. 2C provides the details of the results organizer from step 28 in FIG. 1A. The results organizer processes the documents that match the query and cluster them according to common themes. Clustering may be accomplished, for example, by removing all the common stop-words from the documents and then hashing phrases of different lengths (referred to hereafter as clean phrases), such as phrases consisting of single words, pairs of consecutive words and long sequences of words, to determine which phrases occur in multiple documents that were returned by the search operation.

The hashing function takes all the text fields contained in the documents, deletes all the common stop-words, and then hashes all the clean phrases into a particular position in a hash table. Typically, a hash address value for a particular item is generated by applying an algorithm (the hashing function) directly to the item. The hashing function generates different hash table addresses for different items while generating the same hash table address for identical items.

While the exemplary embodiments of the invention are described as using a hashing function to cluster the query results, it is contemplated that other methods of clustering, may be used instead of the hashing function. One such alternate method might be to form a concordance. Clean phrases in each document may be alphabetically sorted as they are received to form a list of all of the words in the combined documents. Each item in the list may include the clean phrase, a list of the documents in which the clean phrase occurs and the offset in each document at which the clean phrase occurs. This concordance may be used to cluster clean phrases in the documents based on the occurrence of single words or on the near occurrences of groups of words in the documents. Another alternate method might be to form a vector for each document in the multidimensional space defined by all the clean phrases in the documents. Each dimension of this space can correspond to a single clean phrase in the document collection, and the corresponding position in a document's vector is set to 1 if the document contains the clean phrase and to 0 otherwise. Any number of geometric clustering algorithms can then be used to cluster the vectors into a small number of clusters so as to minimize a geometric measure of the cluster, such as the volume of the cluster or the cluster's diameter.

As illustrated in FIG. 2C, after the documents have been hashed in step 63, the hash tables are analyzed to identify the clusters as shown in step 65. The results of the clustering are then displayed in step 67 and shown by example in FIG. 4. FIG. 4 is an example of a graphical display of a search query according to a first embodiment of the present invention.

In the exemplary embodiment, the clustering algorithm is implemented in the language Perl, which includes a non-collision hashing function. An exemplary embodiment hashes each clean phrase from the document title, URL, and summary to any entry in the hash table (also known as a hash bucket) using the hashing function in Perl. The exemplary hash table entry includes counts of the number of documents that contain the hashed clean phrase. At the end of the hashing process, each entry in the table may or may not represent a cluster. The entries are analyzed to determine the best clusters by weighing both the number of documents that contain the common clean phrase and the length of the clean phrase. The best clusters are output to the user.

FIG. 4 is an illustration of a clustered display for a query. For example, the query produced over 400 matching documents. The system discovers a small number of interesting patterns by using pattern matching and clustering algorithms. The results organizer produced clusters 410, 420, 430 and 440 for this sample set of documents. The partition of the documents into only 4 clusters is not intended to limit to scope of the invention rather it is shown for simplicity and illustrative purposes only. For each cluster, the system displays the number of documents that are in the cluster, the common clean phrase, and a representative document from the cluster. For example, cluster 410 contains 23 documents whose common theme is the phrase "www.quickaid.com/airports". For a URL, any characters found between consecutive slashes are interpreted as a word in the text. For example, a URL http://www.quickaid.com/airports/newark/ewr0444/dayd.html would cause the following "words" to be hashed: www.quickaid.com, airports, newark, ewr0444 and dayd. In addition to single "words", the following two-word phrases and long phrases would also be hashed: www.quickaid.com/airports, airports/newark, newark/ewr0444, ewr0444/dayd and www.quickaid.com/airports/newark/ewr0444/dayd.

The user may choose to view any of the discovered clusters; the system, then, displays the documents that appear in the selected cluster. For example, as shown in FIG. 4, if the user were to choose cluster 410, the system would display the 23 documents that contain "www.quickaid.com/airports".

FIG. 5 shows an example of a graphical display of a search query for a second exemplary embodiment of the invention. The clustering lenses interface consists of a display of the title, URL, content and age lenses and a Combination window. For each lens, the corresponding part of each matching document is analyzed. As a result, a small number of interesting patterns are discovered and presented to the user by using pattern matching and clustering algorithms. Users also have the option of specifying their own patterns. More specifically, each tool takes one field at a time and partitions all the documents returned by the search engine according to a pattern found in that field. The documents may be partitioned into 1 to 5 clusters or more. Since the pattern analysis is performed on each field separately, it corresponds to viewing the documents through a lens that only displays the field of interest and hides the other fields.

FIG. 5 shows an illustration of a display for a query about New Jersey restaurants. For example, this query produces 100 matching documents. Title lens 500 partitions the documents found into 3 clusters corresponding to cells 502, 504 and 506. Title Lens 500 considers similarities in the titles of the matching documents. Searching for similarity in both format and words does the partitioning. For example, a format similarity is documents with "No Title" or documents whose title begins with "Re:". A word similarity refers to any common subsequence of words in the title. The strongest word similarity is identical titles; a weaker word similarity is an identical phrase within titles or identical words separated by other words, e.g. "Jane K. Doe' and Jane Katherine Doe".

Title Lens 500 finds that 40 titles contain the phrase "NJWeb: Dining in New Jersey" corresponding to a cluster in cell 502. In cell 504, title lens 500 finds 20 titles that start with the word "Yahoo!". In cell 106, title lens 500 finds that the remaining 40 titles do not have any interesting patterns. In this exemplary embodiment of the invention, the width of each cell in the display is proportional to the number of documents the cell represents. The partition of the documents into only 3 clusters is not intended to limit to scope of the invention rather it is shown for simplicity and illustrative purposes only.

Also shown in FIG. 5 is URL Lens 510 which partitions the 100 documents found into four clusters corresponding to cells 512, 514, 516 and 518. URL Lens 510 considers similarities in the matching documents' Web addresses. For example, if there are many files with "pub/biblio" as part of the pathname, they may form a cluster. In general, any nontrivial contiguous part of the file path is mined for patterns. URL lens 510 finds 40 URLs that contain the term "www.njweb.com/dining" corresponding to cell 512. In cell 514, URL lens 510 finds 20 URLs that contain the term "yahoo.com". In cell 516, URL lens 510 finds 20 URLs that contain the term "metrocast.com". In cell 518, URL lens 510 finds 20 URLs that have no patterns. Furthermore, the 40 URLs having "www.njweb.com/dining" as a substring are exactly those with titles "NJWeb: Dining in New Jersey". Such a fact is indicated by the edges 550 joining cells 502 and 512. Edges 552 indicate that the documents clustered in Cell 504 are exactly those documents clustered in cell 514.

Further, FIG. 5 shows Content Lens 520 with the 100 documents found partitioned into 4 clusters corresponding to cells 522, 524, 526 and 128. Content lens 520 considers similarity in the short excerpts of the matching documents.

Content lens 520 first eliminates stop words, such as "a", "an", "the", "to", etc., and then tries to partition the documents by common sentences, phrases or words. As an example, content lens 520 finds 40 documents that contain the term "Home allendale bayonne belleville bergenfield bloomfield butler" corresponding to a cluster in cell 522. In cell 524, content lens 520 finds 20 documents that contain the term "top business and economy companies restaurants organizations". In cell 526, content lens 520 finds 20 documents that contain the term "cape may county". Contact lens 520 finds 20 documents that have no patterns in cell 528. Edges 554 indicate that documents clustered in cell 512 are exactly the same documents corresponding to cell 522. Edges 556 indicate that the documents found in cell 514 are exactly the same as the documents clustered in cell 524.

FIG. 5 also shows Age legs 530. Age lens 530 clusters on the documents' date of last update. Age lens 530 partitions the 500 documents found into 4 clusters corresponding to cells 532, 534, 536, and 538. Cell 532 shows 40 documents which were updated on Mar. 4, 1997. Cell 536 finds 30 documents updated on 1997. Cell 536 finds 20 documents updated on 1996. Cell 538 finds 10 documents updated on 1995.

Figure 6:
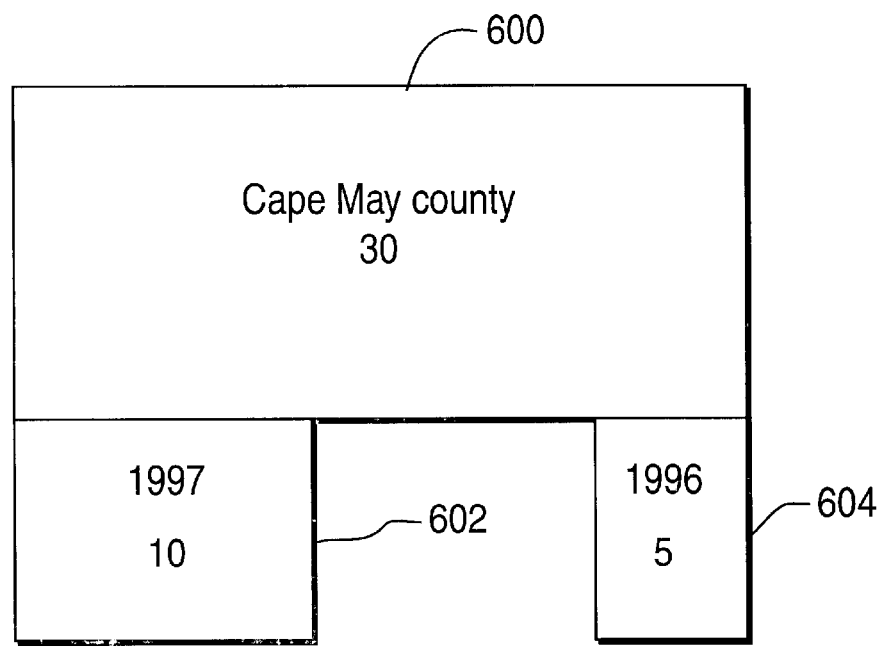
FIG. 6 is an example of a graphical display of a selected search result of FIG. 5.

FIG. 5 shows the window of clusters results from which the user may select any number of cells from Lenses 500, 510, 520 and 530. The system, then, displays the documents that satisfy the conditions in all the selected cells. For example, as shown in FIG. 6 which is a graphical display of a selected search result of FIG. 5. In FIG. 5, the user chooses cell 526 corresponding to "Cape May County", cell 534 corresponding to the year 1997 and cell 536 corresponding to year 1996. As a result, the system displays 15 documents that contain "Cape May County" and were last updated in 1996 or 1997. The documents found are clustered and displayed in cell 600. Cell 602 indicates that 10 of the documents found were updated in 1997. Cell 604 indicates that 5 out of the 15 documents found were last updated in 1995.

In another embodiment of the invention, the set of keywords from the search query are used to rank the documents returned by the search engine. The more keywords that appear in a document, the higher the document is ranked. The results organizer outputs results from the highest ranked to the lowest ranked.

The benefit of clusters to the user is that the clusters may contain all items of interest or duplicate items. In the first case, only items in the cluster need be reviewed by the user. While in the second case, only one item from the cluster needs to be reviewed by the user prior to rejecting all the other documents in the cluster. The "Vote" column in the display allows the user to indicate the relevancy of a cluster to his informational needs. If the user votes positively on a cluster, the system can use the documents in the desired cluster (referred to hereafter as good documents) to recluster the remaining documents, giving a higher weight to documents that are similar to the good documents. If the user votes negatively on a cluster, the system can use the documents in the undesired cluster (referred to hereafter as bad documents) to recluster the remaining documents, giving a lower weight to documents that are similar to the bad documents.

All clusters which receive a yes vote are saved along with the query in a search context folder. A user has the ability to find a query and its results by either browsing the search context folders or doing a keyword based search for them among all the search context folders.

Often times, it is desirable to filter the output of search engines, to prevent information from being displayed. If the search engine returns a large set of URLs, one may want to restrict it to pages that were visited only last week, or to pages that have been bookmarked, or to a smaller set of URLs that are relevant, based upon some specific criteria not previously captured in the search engine index. Sometimes it is desirable to filter the output to exclude pages to which a user should not have access. Referring to FIG. 2B, there is shown the details of the dynamic filter processor in step 24 of FIG. 1A. The dynamic filtering, based on a dynamic set of URLs, is used to restrict the results of a search query. In the exemplary embodiment of the invention, the dynamic set of URLs can be determined explicitly by the user from a user profile as shown in step 57 of FIG. 2B, or, in general, from information stored in other information management systems. Once the profile is accessed, then in step 59 the URL's may be filtered and the results are displayed in step 61.

Figure 7:
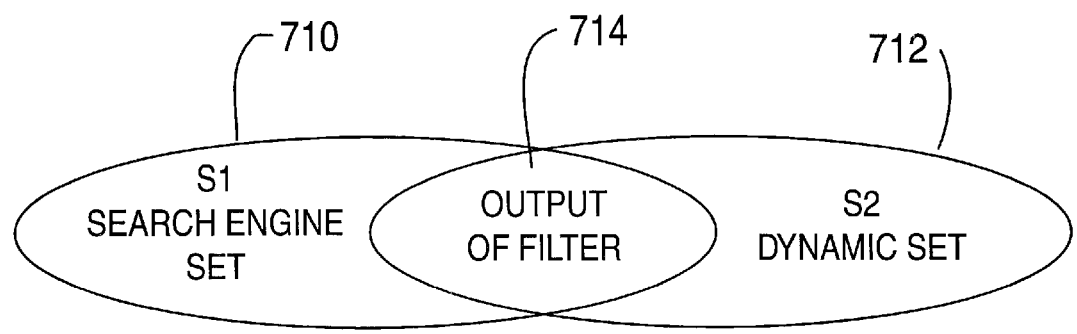
FIG. 7 is a Venn diagram of the theoretical operation according to a third exemplary embodiment of the present invention.

FIG. 7 is a Venn diagram which illustrates a dynamic filtering operation. In FIG. 7, area 710 defines S1 as the set of URLs of pages and their summaries, returned by the search engine, in response to a query for text in its own information management system. Let n be the number of URLs in S1. There are also n summaries corresponding to each URL of S1. Area 712 defines S2 as the set of URLs that is dynamically generated by the user or by a query external to the search engine. Let m be the number of URLs in S2. There are no summaries associated with these URLs. S1 and S2 are likely to have URLs in common. The filter returns the URLs in the intersection of S1 and S2 and the respective summaries corresponding to area 714.

The dynamic filtering of the present invention may improve upon the poor performance of other filtering techniques which typically involve multiple disk fetch and store operations and several sorting steps. The performance of a fetch and store filtering technique of this type would be $O((m+n)\log(m+n))$. In contrast, the dynamic filtering of the present invention uses hashing and associated arrays in an intelligent fashion and has a performance of $O(m+n)$.

First, for set S2, an associative array is setup as shown in Table 1.

Table 1

Flag[url_1]=1;
Flag[url_2]=1; . . .
Flag[url_m]=1;

In table 1, "url_n" represents a hash address generated from a particular URL. This process takes m steps. The Flag array indicates the URLs to be included from S1.

As the search engine starts returning URLs of set S1, a hash index into the associative array is generated from the URL and a check is performed to see if the corresponding Flag is set. Only the URLs with the corresponding Flag set and their summaries are provided as the output URL's of the dynamic filter. Everything else is ignored. After the URL is provided as an output URL, its Flag is reset to 0, to ensure that the same URL is not presented again. This is performed sequentially and hence takes n steps. The entire algorithm is therefore $O(m+n)$ since lookup using a hash table in an associative array is $O(1)$. The result of this process is the intersection of S1 and S2, with the associated summaries from S1. Duplicate URLs, if returned by the search engine are eliminated.

Figure 8:
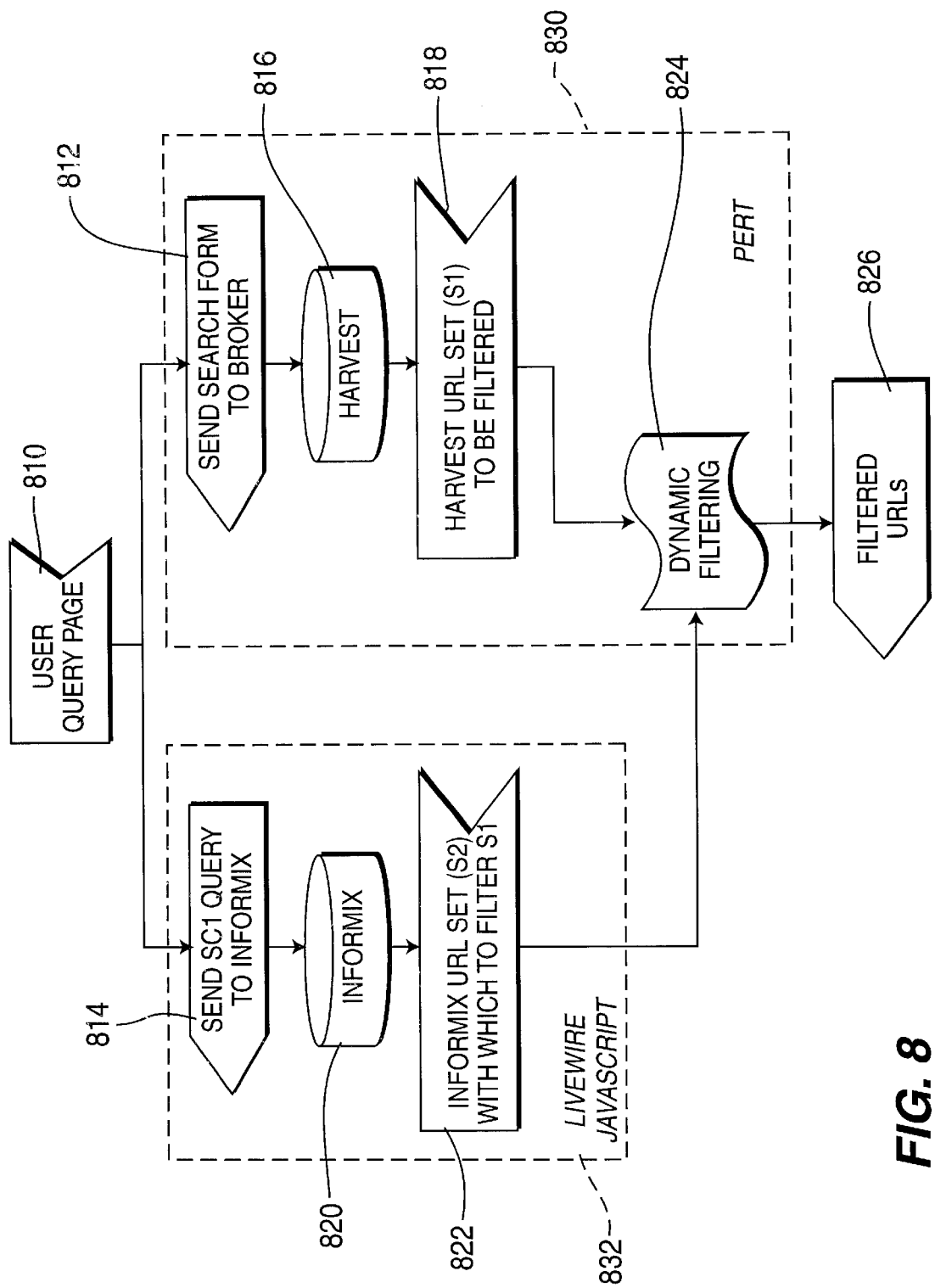
FIG. 8 is a functional block diagram of an exemplary implementation of the third exemplary embodiment of the invention.

FIG. 8 shows the architecture of an exemplary implementation according to the third embodiment of the present invention. The implementation uses commercially available tools such as a Harvest search engine, an Informix database and a dynamic filter implemented using JavaScript and Perl.

As an example, a particular implementation is the one of a student wanting to search pages of an Internet course that he is taking, but limiting it to the pages he visited last week.

The Student is presented with a query page 810. Query page 810 is a form where the student user inserts the text to search and specifies to limit the search only to pages he visited last week. When the form is submitted, the query is split in two other queries 812 and 814. Query 814 goes to the Informix database 816 which has tracked the student's navigation in the course. The Informix database 816 generates a dynamic set 822 of URLs (S2) which represents the pages he visited last week. Dynamic set 822 of URLs S2 is then passed to dynamic filter 824, which sets up an associative array of flags as explained above, with reference to FIG. 7.

Query 812 goes to the Harvest search engine 816 which is configured to index all the pages of the course. Upon receiving query 812, the Harvest search engine 816 starts to return pages from its index. The pages returned are all of the pages for the course no matter when the student visited the course pages, since student access information is not stored in the search index. The Harvest search engine 816 also returns pages that the student has not yet visited. The output set 818 from Harvest S1, is processed against the Flag array by dynamic filter 824 and the intersection is returned. The algorithm also filters out duplicates.

Dynamic filtering according to the present invention, can be implemented anywhere one desires to restrict/filter one set of URLs by another set of URLs. This may be desirable, for example, for security reasons, when a company wants to restrict access to its resources based on the employee's identity. Different employees may have associated with different lists of URLs that they have permission to read. When a search is performed, the company can insure that only those URLs that are not restricted for the particular user are presented. This addresses a common problem that search engines have: returning summaries of pages to which a user does not have access. Usually, search engines return summaries of protected pages, even if the user is restricted access to those pages via web server password protection or other mechanisms. Adult related material can also be filtered the same way. Internet service providers could use dynamic filtering to prevent children from searching adult web sites and newsgroups. Personalizing search engines in an educational environment can be taken to higher levels. A student can associate various topics with the visited pages and then, search the database based on URL's that are associated with a particular topic. A teacher may also mark certain pages as being essential for a final exam, or as potential topics for independent study. Then searching could be restricted to this set of pages only.

For each component of the user's query, there are a few natural ways in which the query may be either restricted further or relaxed further to potentially produce either fewer results or a greater number of results. This concept is best illustrated by an example. Suppose the user's query specifies that the phrase "cryptographic protocols" appear as a heading in the document. A more restrictive, or stricter, query would require that "cryptographic protocols" be part of the title, which would typically yield fewer results in comparison to the user's query. A less restrictive, broader query would specify that "cryptographic protocols" appear anywhere in the text, which would typically yield a greater number of results in comparison to the user's query. Another way to relax the user's query is to require that the words "cryptographic" and "protocols" appear near each other in a heading, rather than as a phrase. Relaxation and restriction of the query is precisely the process that a user currently performs, with no help from the search engine, in order to refine the user's search. A query tuner according to the present invention offers the user a helpful guide in the user's quest by taking the user's query and generating a small number of additional queries according to a query hierarchy. The user's query and the additional queries are forwarded to the search engine. The query tuner, then, evaluates the results of all the queries and suggests possible query reformulations to the user, together with the expected number of matching documents each reformulation would yield.

Since each search engine has its own query language, the query tuner, as shown in FIG. 2A, is defined for an abstract query language that can easily be mapped to any particular engine's language. In most search engines, there are two types of data that the user can input: content that is to be matched to the text of documents, and structure, or meta-data, related to each document that represents conditions to be satisfied in order for a document to be considered a match. For example, in the AltaVista query shown in Table 2.

Table 2 title: "cryptographic protocols"
English language
dated after Jan. 1, 1997

For this example, content is "cryptographic protocols" and meta-data is all the other information, consisting of the requirements that the content appear in the title of the document, that the document's language be English, and that the document be dated after Jan. 1, 1997. The query requests all pages that have the keyword "cryptographic protocols" in the title, that are written in the English, and that are dated after Jan. 1, 1997.

In addition, to the types of data, there is an implicit or explicit Boolean operation to be performed on the different parts of the query. In the above query, there is an implicit "AND" operator among all of the query parts. In other words, implicitly the query specifies that the phrase "cryptographic protocols" appear in the content of the document AND that this match be in the title AND that the document's language be English AND that the document be dated after Jan. 1, 1997. A query may be formally defined to be a Boolean expression $Q=(q_i)$ op $(q_j)$, where op is a Boolean operation from the set {AND, OR AND NOT, BEFORE$_W$, NEAR$_W$}, and each of $q_i$, $q_j$, is either a Boolean expression, or of the form (m:k), where m is a (possibly empty) meta-data quantifier and k is a (possibly empty) keyword. The Boolean operators AND, OR and NOT have the standard meanings; x NEAR$_w$ y is TRUE if an only if x appears within w words of y; x BEFORE$_w$, y is TRUE if x appears at most w words before y.

A document satisfies or matches a query if it satisfies the Boolean expression Q, where satisfying (m:k) means that the keyword k satisfies (or appears in) meta data m. A keyword k can be a single word, a phrase, or a word with some wildcard characters. Meta-data can be any structural information such as title, heading, URL, domain, filename, file extension, date; it can also be a specification to the quality of the match required. For example, an approximate match meta-data operator (approx$_d$ y) evaluates to TRUE for a phrase x if and only if x can be transformed into y (or vice versa) with at most d single-letter deletes, insertions or substitutions; a synonyms operator (syn y) evaluates to TRUE for a phrase x if and only if x is a synonym of y.

Figure 9A:
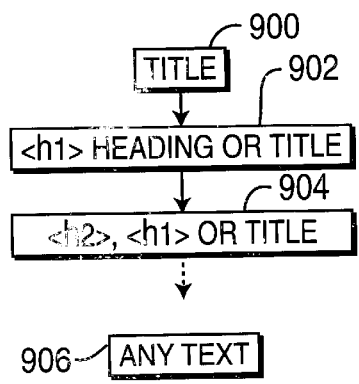
FIG. 9(a) is a hierarchy tree according to a fourth exemplary embodiment of the invention.

A hierarchy forest may be defined on all the meta-data of a query, where each tree contains meta-data that has certain relationship to other meta data. As shown in FIG. 9(a), for example, the structural meta-data of an HTML document forms a natural hierarchical list from the tags that specify the most prominent information in the document, i.e. title, to tags that specify the least prominent information in the document, i.e. text. In FIG. 9(a), requiring the keywords to appear in the title 900 is more restrictive than requiring the keywords to appear in the title or level 1 heading 902. Cell 902, in turn is more restrictive than requiring the keywords to appear in the title or level 1 or level 2 heading 904. An even broader search query can be done with respect to cell 904, which adds the level 2 headings to the query in cell 902. The broadest most general query can be done with respect to cell 906, which allows any text to be searched.

Figure 9B:
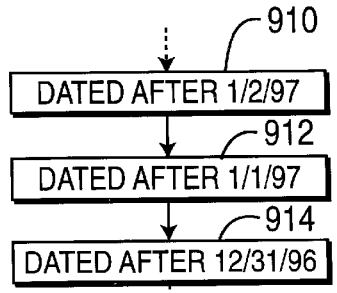
FIG. 9(b) is another hierarchy tree according to the fourth exemplary embodiment.
Figure 9C:
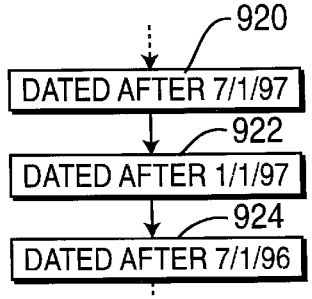
FIG. 9(c) is yet another hierarchy tree according to the fourth exemplary embodiment.

In general, each hierarchy tree is ordered top to bottom from meta-data values that most restrict the query to values that least restrict the query. For example, numerous hierarchies are appropriate for the date field, depending on the desired granularity. In the context of recent news stories, a daily granularity is appropriate as shown in FIG. 9(b). Cell 910 restricts the search to documents dated after Jan. 2, 1997 while cell 912 restricts the search to documents dated after Jan. 1, 1997. A search with a cell 912 restriction is broader and encompasses the search with a cell 910 restriction. An even broader search can be done with a cell 914 restriction which includes documents dated after Dec. 31, 1996. On the other hand, in the context of general web pages, a yearly or biannual granularity is more relevant as shown in FIG. 9(c). Cell 920 restricts the search to documents dated after Jul. 1, 1997 while cell 927 restricts the search to documents dated after Jan. 1, 1997. A broader search can be done with respect to documents dated after Jul. 1, 1996 in cell 924.

Figure 10A:
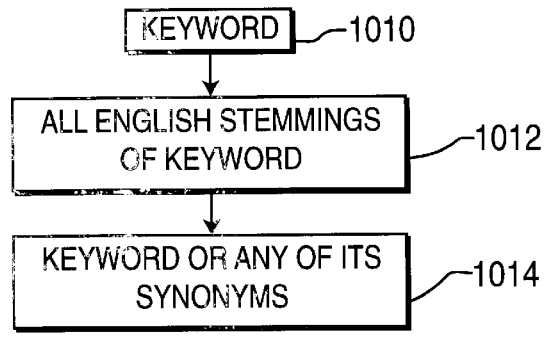
FIG. 10(a) is a further hierarchy tree according to the fourth exemplary embodiment.

As with the meta-data, there is a hierarchy for the keywords. For example, as shown in FIG. 10(a), the top of the hierarchy is represented by cell 1010 and "keyword" corresponds to the most restrictive search query. Second on the hierarchy is cell 1012 corresponding to a broader search that can be done with the "all the English stemmings of keyword". Cell 1014 is at the bottom of the hierarchy and corresponds to the broadest search query related to "keyword or any of its synonyms".

Finally, a hierarchy on the Boolean operators that form the query Q is defined as follows. For a single-word keyword with or without wildcards, the hierarchy is shown in FIG. 10(a). When the keyword is a phrase, it is converted into a Boolean expression to which the Boolean hierarchy applies. More specifically, if $k=w_1, w_2 \ldots w_t$, and $w_i$ is the i-th word in the keyword phrase, m:k becomes $(m:w_1)$ $BEFORE_1$ $(m:w_2)$ $BEFORE_1$ ... $BEFORE_1(m:w_t)$. Although not shown, the bottom-most node in each hierarchy is the NULL expression.

These query hierarchies may be used to help the user refine a given query more effectively. In the Internet's current state, the slowest operation for a user performing a search is the network delays in communicating with the search engine. In a typical search session, the user formulates a query, sends it to the search engine, waits some time, receives an answer, then reformulates the query and repeats the process. Some of the user's frustration comes from having to pay for the network delay during each query reformulation. The present invention cuts down the number of reformulation iterations used to find the relevant information. When the user poses a query, the browser generates a number of related queries and sends all the queries to the search engine in parallel. The time to receive the complete results for the users query and just the number of matches for each of the related queries is asymptotically the same as the time to receive the results of just the user's query. Referring to FIG. 2A step 55, the next step performed by the query tuner is to formulate the related queries. This process as well as how the results of the query aid the user is described below.

The formulation of related queries according the query hierarchies is illustrated based on a sample query Q=((title;cryptographic) $BEFORE_1$(title;protocols)) AND ((English language) AND (dated after Jan. 1, 1997)). The term item is used to refer to any atomic part of the query: a meta-datum, a keyword or a Boolean operator. For example, Q contains the following set of items {title, cryptographic, $BEFORE_1$, title, protocols, AND, English language, AND, dated after Jan. 1, 1997}. For each query item t, define h(t) to be the node in the hierarchy forest corresponding to the item t. Related queries consists of a set of queries, each of which takes the original user query and modifies some items in it by either restricting or broadening them according to the hierarchy forest. The act of broadening (restricting) a query item t corresponds to using a descendant (an ancestor) of h(t) in place of t within Q.

For example, one set of related queries for our sample query Q is shown in Table 3

Table 3

((title:cryptographic) $BEFORE_1$ (title: protocols))
((<h1> or title: cryptographic) $BEFORE_1$ (<h1> or title: protocols)) AND((English language) AND (dated after Jan. 1, 1997))
((title:cryptographic) $BEFORE_2$ (title: protocols)) AND ((English language) AND (dated after Jan. 1, 1997))
((title:cryptographic) $NEAR_1$ (title: protocols) AND ((English language) AND (dated after Jan. 1, 1997))
((title:cryptographic) $BEFORE_1$ (title: protocols)) AND (dated after Jan. 1, 1997))
((title:cryptographic) $BEFORE_1$ (title: protocols)) AND (English language))
((title:cryptographic) $BEFORE_1$ (title: protocols)) AND (English language) AND (dated after Jan. 1, 1997)

Where <h1> represents the main index level or the highest level heading in the HTML of the page.

Figure 10B:
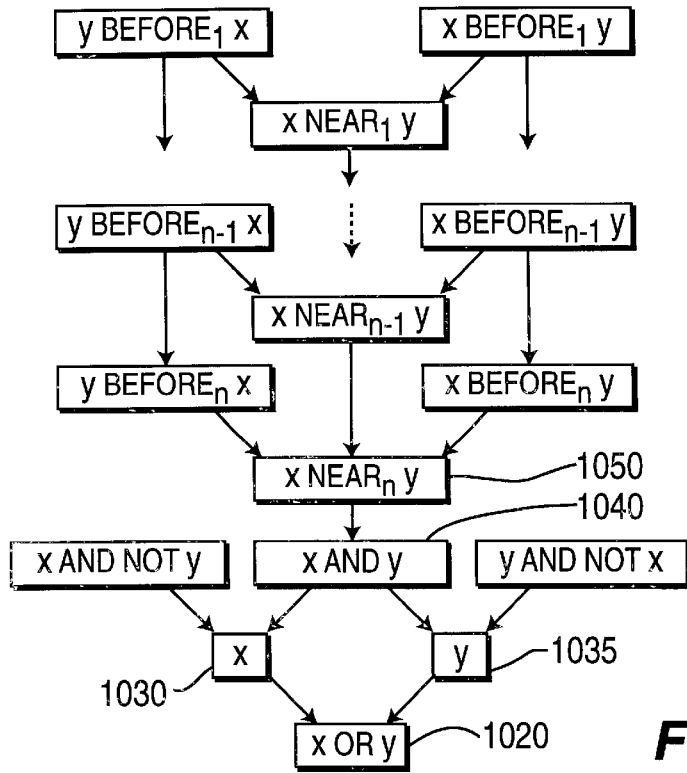
FIG. 10(b) is a further hierarchy tree according to the fourth exemplary embodiment.

The exemplary tree shown in FIG. 10(b) indicates that the search can be contracted or restricted by moving up the tree. In addition, it indicates that the search can be expanded by moving down the tree. For example, a search limited to x AND y according to cell 1040 can be restricted by moving up the tree and searching according to cell 1050 where the search is restricted to x NEARn y. In contrast, the search can be expanded by moving down the tree and searching for only x according to cell 1030 or searching for only y according to cell 1035. The search can be further expanded by searching for x OR y according to cell 1020.

The generation of a set of related queries may be accomplished, for example, by holding all but one items of Q constant, while broadening or restricting the chosen item t of Q. The broadening (restricting) may be accomplished by traversing any number of edges up (down) the hierarchy tree from h(t). Since different edges in the hierarchy forest have different restrictive/broadening effects on the query, it is more efficient to traverse different number of edges in the tree for different items in the query. In the exemplary embodiment of the invention, the number of edges traversed is a fraction of the height of the hierarchy tree. Formally, an f-family is defined as a set of queries, each of which takes the original user query and modifies a set $\{t_1\ t_2 \ldots t_s\}$ of items in the query, where each modified item $t_j$ is replaced by a node that is exactly min$\{1, f*H\}$ edges away from $h(t_j)$ in h($t_j$)'s hierarchy tree. The variable f is in the interval (0,1) and H is the height of h($t_j$)'s hierarchy tree. In practical terms, it is desirable to generate a small but non-trivial number of related queries, say 5–10. Depending on the length and complexity of the original query and the value s, f-family can produce quite a substantial number of queries. In such a case, only a reasonable number are forwarded to the search engine. The queries are chosen by ordering the items to be modified from the outermost Boolean operator, to the innermost until the goal number is reached. The choice of parameter f is based on experience of the particular user, as well as the query specification. On the other extreme, if the query is very basic, such as a single word, all the possible related queries may be generated.

Although the invention is illustrated in terms of broadening and restricting one item at a time and determining the replacement by using the same variable fraction f for each item, it is contemplated that any number of items can be simultaneously changed and that the replacement for each can be determined independently by traversing any number of edges in the item's hierarchy tree.

The results returned by the search engine contain the complete answer to the user's query, together with the number of matches that each of the related queries would elicit. The relative number of matches that the related queries produce is useful in providing the user with a measure of the relative restrictiveness of the different items in the query. Based on this extra information, the user may be able to reformulate a query in a more intelligent way than he could otherwise.

An example implementation of the user interface is shown in FIG. 11. In addition to the query, the user can specify the number of matches she would be most interested in seeing. Out of all the related queries generated by the query tuner, only those that yield close to the desired number of results are displayed to the user.

Although illustrated and described herein with reference to certain specific embodiments, the present invention is nevertheless not intended to be limited to the details shown. Rather, various modifications may be made in the details within the scope and range of equivalents of the claims and departing from the scope of the invention.

The invention claimed is:

1. A method for generating search queries to be sent to a search engine for searching a information management system, comprising the steps of:
   a) receiving an initial search query;
   b) converting the initial search query to general boolean language;
   c) identifying a level in a respective hierarchy tree for each search query item in the initial search query;
   d) formulating additional related search queries by substituting items from the respective hierarchy tree for selected items in the query, the substituted item having a level in the hierarchy tree that is greater than or less than the level of the query item in the initial query; and
   e) forwarding the initial search query and the additional search queries in parallel to the search engine.

2. A method for generating search queries according to claim 1 wherein the information management system to be searched is a global information network.

3. A method for generating search queries according to claim 1 wherein the search query items are selected from a group consisting of: a meta-datum, a keyword and a Boolean operator.

4. A method for generating search queries according to claim 1 wherein the additional related queries consist of a set of queries generated by selecting each query item in the initial search query for substitution to form a respectively different one of the related queries.

5. A method for generating search queries according to claim 4 wherein the initial search query is modified by restricting and broadening the search query by traversing one edge up and one edge down on the hierarchy tree for the selected query item.

6. A method for generating search queries according to claim 5 wherein the number of edges of the hierarchy tree to be traversed is increased to generate additional queries.

7. A method for generating search queries according to claim number 1 wherein the step of receiving an initial search query includes retreiving keywords from a prior search and adding them to the search query.

8. A method for organizing a set of records into clusters comprising the steps of:
   a) receiving the set of records;
   b) analyzing at least one text field from each record of the set of records to determine any patterns;
   c) partitioning each record by the text field analyzed in step (b) into clusters based on a shared pattern, wherein the step of partitioning a set of records consists of the steps of:
      c1) hashing all the single words, all the pairs of consecutive words and all long sequences of words for each record in the set of records; and
      c2) partitioning a set of records by the text field hashed in step (c1) into clusters
   d) analyzing the partitions to identify the clusters for display; and
   e) displaying the clusters to the user.

9. A method for organizing a set of records into clusters, comprising the steps of:
   a) receiving the set of records;
   b) analyzing at least one text field from each record of the set of records to determine any patterns;
   c) partitioning each record by the text field analyzed in step (b) into clusters based on a shared pattern;
   d) analyzing the partitions to identify the clusters for display; and
   e) displaying the clusters to the user;
   wherein the step of analyzing the partitions to identify the clusters for display includes analyzing a best cluster for display by weighing both the number of documents that contain the shared pattern and the length of the shared pattern.

10. A method for organizing a set of records into clusters according to claim 9, wherein each record is a document having a uniform resource locator (URL), a title, a document excerpt and date information, and the fields to be analyzed are selected from a group consisting of: the title, the URL, the document excerpt and the date information.

11. A system for generating search queries to be sent to a search engine for searching a information management system, comprising:
   a) means for receiving an initial search query;
   b) means for converting the initial search query to general Boolean language;
   c) means for placing each search query item in the initial search query into a hierarchy tree;
   d) means for formulating additional related search queries by replacing at least one search query item with an item either above or below the search query item in its hierarchy tree; and e) means for forwarding the initial search query and the additional search queries in parallel to the search engine.

12. A system for organizing a search engine's results including a set of documents each document including a plurality of fields, comprising:
   a) means for receiving the set of documents;
   b) means for analyzing several fields from each document to determine patterns
   c) means for partitioning each document by the fields analyzed in step (b) into clusters based on a shared pattern;
   d) means for analyzing the partitions to identify clusters for display;
   e) means for displaying the clusters of documents to the user; and
   f) means for user selection of the clusters for viewing;
   wherein the means for analyzing the partitions to identify the clusters for display includes means for analyzing a best cluster for display by weighing both a number of documents that contain the shared pattern and a length of the shared pattern.

13. A carrier including a computer program which, when executed by a processor, causes the processor to generate search queries to be sent to a search engine for searching a information management system, the computer program causing the computer to perform the steps of:
   a) receiving an initial search query;
   b) converting the initial search query to general Boolean language;
   c) placing each search query item in the initial search query into a hierarchy tree;
   d) means for formulating additional related search queries by replacing at least one search query item with an item either above or below the search query item in its hierarchy tree; and
   e) forwarding the initial search query and the additional search queries in parallel to the search engine.

14. A carrier including a computer program which, when executed by a processor, causes the processor to organize a set of documents into clusters, by causing the computer to perform the steps of:
   a) receiving the set of documents;
   b) analyzing at least one field from each document to determine a pattern;
   c) partitioning each document by the fields analyzed in step (b) into clusters based on a shared pattern;
   d) analyzing the partitions to identify the clusters for display;
   e) displaying the clusters to the user; and
   f) allowing the user to select one or more of the clusters for viewing;
   wherein the step of analyzing the partitions to identify the clusters for display includes the step of analyzing a best cluster for display by weighing both a number of documents that contain the shared pattern and a length of the shared pattern.

* * * * *